(12) United States Patent
Liu

(10) Patent No.: US 10,972,663 B2
(45) Date of Patent: Apr. 6, 2021

(54) METHODS FOR AUTOMATICALLY SWITCHING VIDEO CAPTURING AND PLAYING BACK FRAME RATE

(71) Applicant: GUANGDONG OPPO MOBILE TELECOMMUNICATIONS CORP., LTD., Guangdong (CN)

(72) Inventor: Chang Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/001,321

(22) Filed: Aug. 24, 2020

(65) Prior Publication Data

US 2020/0389591 A1 Dec. 10, 2020

Related U.S. Application Data

(63) Continuation of application No. PCT/CN2018/084128, filed on Apr. 23, 2018.

(51) Int. Cl.
*H04N 5/232* (2006.01)
*G06T 7/215* (2017.01)
(Continued)

(52) U.S. Cl.
CPC ........ *H04N 5/23245* (2013.01); *G06T 7/215* (2017.01); *G11B 27/005* (2013.01);
(Continued)

(58) Field of Classification Search
None
See application file for complete search history.

(56) References Cited

U.S. PATENT DOCUMENTS 8,830,339 B2 9/2014 Velarde
9,224,045 B2 12/2015 Land et al.
(Continued)

FOREIGN PATENT DOCUMENTS

| CN | 102957864 | 3/2013 |
| CN | 105245817 | 1/2016 |
| CN | 107396019 | 11/2017 |

OTHER PUBLICATIONS

WIPO, ISR for PCT/CN2018/084128, dated Jan. 11, 2019.
EPO, Extended European Search Report for EP 18915935.3, dated Oct. 27, 2020.

*Primary Examiner* — Eileen M Adams
(74) *Attorney, Agent, or Firm* — Hodgson Russ LLP

(57) ABSTRACT

A method includes receiving an indication that a video mode is invoked, where the receiving causes the following operations to be automatically performed: obtaining a first frame and a second frame at a first frame rate; defining a first ROI in the first frame based on a user's selection; defining a second ROI in the second frame based on the first ROI; determining a first camera motion flow; determining a first ROI motion flow between the first ROI and a corresponding portion of the second ROI; determining a second frame rate based on a first comparative value determined using the first ROI motion flow and the first camera motion flow; and capturing a third frame at the second frame rate by an image sensor unit, or playing back a fourth frame at the second frame rate on a touch screen unit.

20 Claims, 11 Drawing Sheets

(51) Int. Cl.
*G11B 27/00* (2006.01)
*H04N 5/77* (2006.01)

(52) U.S. Cl.
CPC ......... *H04N 5/232935* (2018.08); *H04N 5/77* (2013.01); *G06T 2207/10016* (2013.01)

(56) References Cited

U.S. PATENT DOCUMENTS

| | | | |
|---|---|---|---|
| 9,247,098 | B2 | 1/2016 | Hartford |
| 2007/0195182 | A1 | 8/2007 | Ito |
| 2012/0176505 | A1 | 7/2012 | Kim et al. |
| 2014/0327940 | A1* | 11/2014 | Amtrup .................. G06K 9/18 |
| | | | 358/473 |
| 2017/0180653 | A1 | 6/2017 | Kang et al. |
| 2017/0289444 | A1* | 10/2017 | Han .................. H04N 5/23293 |
| 2019/0132570 | A1* | 5/2019 | Chen .................... H04N 5/232 |

\* cited by examiner

METHODS FOR AUTOMATICALLY SWITCHING VIDEO CAPTURING AND PLAYING BACK FRAME RATE

CROSS REFERENCE TO RELATED APPLICATION(S)

This application is a continuation of International Application No. PCT/CN2018/084128, filed on Apr. 23, 2018, the disclosure of which is hereby incorporated by reference in its entirety.

BACKGROUND OF DISCLOSURE

The present disclosure relates to the field of video capturing and playing back, and more particularly, to methods for automatically switching a video capturing and playing back frame rate.

Camera systems, such as mobile phones, digital still cameras (DSCs), digital single-lens reflex cameras (DSLRs), camcorders, drones, and surveillance cameras capture fast motion scenes, such as sporting events, vehicles in motion, and a bird in flight, etc. When camera systems capture fast motion scenes at a normal frame rate, such as 30 frames per second (fps) or 60 fps, the fast motion in scenes may be reproduced as a blur or may be missed. Camera systems may be equipped to capture the scene with the fast motion at a higher frame rate, such as 120 fps, 240 fps, 480 fps or 960 fps, such that the fast motion in the scene may be played back in slow motion, such as at 30 fps or 60 fps, thereby showing the fast motion with more motion detail. In related art, a frame rate for capturing a scene with fast motion is selected by a user just before or while the fast motion takes place. However, the selection depends on human judgement and action and therefore may result in missing timing for desired capturing.

SUMMARY

In a first aspect of the present disclosure, a method includes: receiving an indication that a video mode is invoked on a touch screen unit, wherein the receiving the indication causes the following operations to be automatically performed: obtaining a first frame and a second frame at a first frame rate; defining a first region of interest (ROI) in the first frame based on a first selection of a user for the first frame; defining a second ROI in the second frame based on the first ROI; determining a first camera motion flow between a first region including a portion of the first frame complementary to a region co-located with the second ROI and a corresponding portion of the second frame; determining a first ROI motion flow between the first ROI and a corresponding portion of the second ROI; determining a second frame rate based on a first comparative value determined using the first ROI motion flow and the first camera motion flow; and capturing a third frame at the second frame rate by an image sensor unit, wherein the second frame rate is higher than the first frame rate, or playing back a fourth frame at the second frame rate on the touch screen unit, wherein the second frame rate is lower than the first frame rate.

In a second aspect of the present disclosure, a method includes: receiving an indication that a video mode is invoked on a touch screen unit, wherein the receiving the indication causes the following operations to be automatically performed: obtaining a first frame and a second frame at the first frame rate; determining a first camera motion flow of the first frame and the second frame; determining a comparison basis based on whether the first frame and the second frame include at least one moving object that is classified to be within a predetermined set of scenes; and if a first comparison result of a first motion flow with the comparison basis is positive, determining a second frame rate based on a first comparative value determined using the first motion flow and the first camera motion flow, wherein the first motion flow is associated with the at least one moving object; and capturing a third frame at the second frame rate by an image sensor unit, wherein the second frame rate is higher than the first frame rate, or playing back a fourth frame at the second frame rate on the touch screen unit, wherein the second frame rate is lower than the first frame rate; if a first comparison result of the first motion flow with the comparison basis is negative, capturing a fifth frame at the first frame rate by the image sensor unit or playing back a sixth frame at the first frame rate on the touch screen unit.

In a third aspect of the present disclosure, a non-transitory computer-readable medium with instructions stored thereon is provided. When the instructions are executed by a processor, the processor is configured to perform operations including: sending a first frame rate to an image sensor unit, wherein the following operations are automatically performed after the sending the first frame rate: causing a first frame and a second frame to be obtained at the first frame rate; defining a first ROI in the first frame based on a first selection of a user for the first frame; defining a second ROI in the second frame based on the first ROI; determining a first camera motion flow between a first region including a portion of the first frame complementary to a region co-located with the second ROI and a corresponding portion of the second frame; determining a first ROI motion flow between the first ROI and a corresponding portion of the second ROI; determining a second frame rate based on a first comparative value determined using the first ROI motion flow and the first camera motion flow; and causing a third frame to be captured at the second frame rate by the image sensor unit, wherein the second frame rate is higher than the first frame rate, or causing a fourth frame to be played back at the second frame rate on a touch screen unit, wherein the second frame rate is lower than the first frame rate.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

As used here, the term "using" refers to a case in which an object is directly employed for performing an operation, or a case in which the object is modified by at least one intervening operation and the modified object is directly employed to perform the operation.

Figure 1:
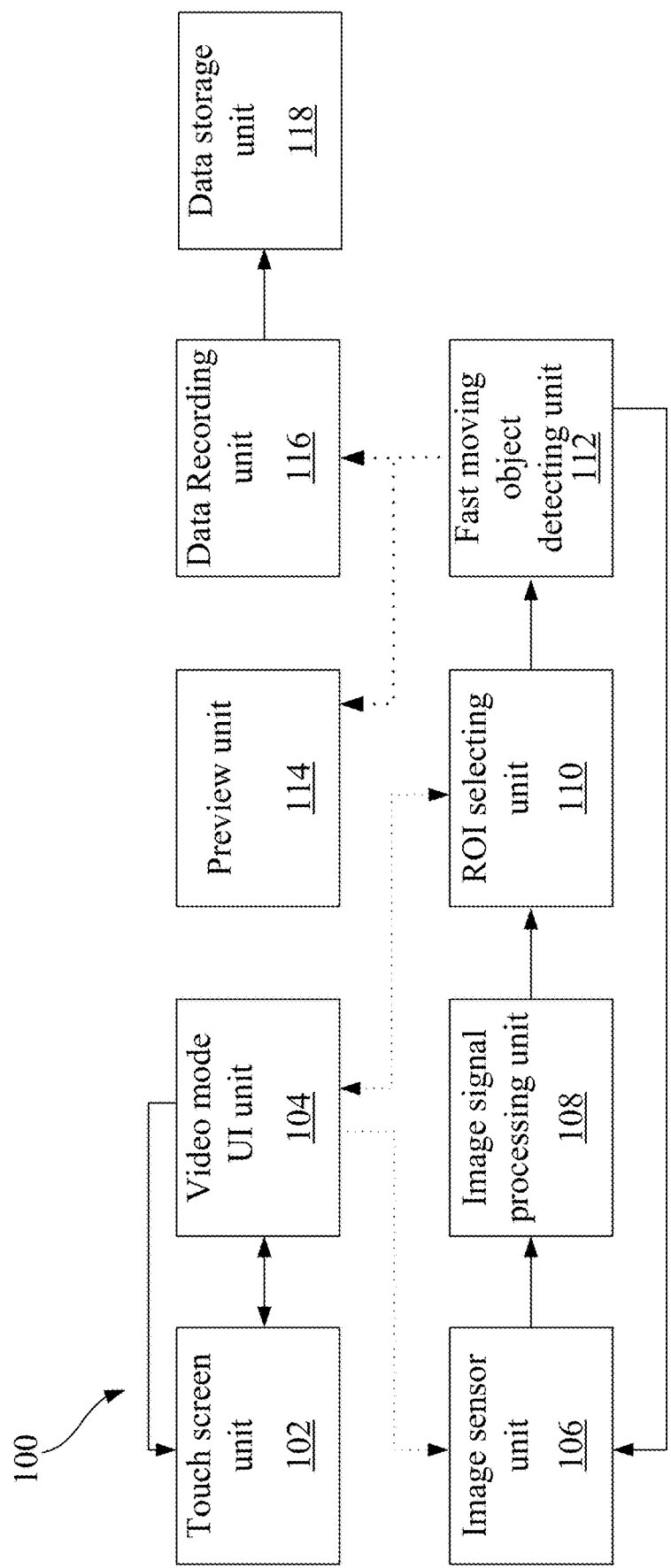
FIG. 1 is a block diagram illustrating a camera system automatically switching a video capturing frame rate according to an embodiment of the present disclosure.

FIG. 1 is a block diagram illustrating a camera system 100 automatically switching a video capturing frame rate according to an embodiment of the present disclosure. Referring to FIG. 1, the camera system 100 includes a touch screen unit 102, a video mode user interface (UI) unit 104, an image sensor unit 106, an image signal processing unit 108, a region of interest (ROI) selecting unit 110, a fast moving object detecting unit 112, a preview unit 114, a data recording unit 116, and a data storage unit 118. In FIG. 1, each solid arrow indicates a direct connection between corresponding units, and each dotted arrow indicates there may or may not be at least one intervening unit in a connection between corresponding units.

In an embodiment, the camera system 100 may be a system with the integrated touch screen unit 102 and image sensor unit 106, such as a mobile phone, a digital still camera (DSC), a digital single-lens reflex camera (DSLR), or a camcorder, or a system with the image sensor unit 106 remote controlled by the touch screen unit 102, such as a drone, or a surveillance camera.

In an embodiment, the touch screen unit 102 enables a user to directly interact with what is displayed on the touch screen unit 102. For example, when the user touches the touch screen unit 102 to select an object in a frame displayed on the touch screen unit 102, a touched position may be generated. The touched position may be generated using, for example, resistive sensing, capacitive sensing, surface acoustic wave sensing, infrared sensing, optical sensing, or strain gauge sensing. In an embodiment, the video mode UI unit 104 provides a UI for a video mode. The UI may be used for the user to invoke the video mode and serve as an interface between the touch screen unit 102 and the image sensor unit 106, and used for the user to select the object in the frame and serve as an interface between the touch screen unit 102 and the ROI selecting unit 110.

In an embodiment, the image sensor unit 106 may obtain light information from a scene and capture a raw frame of the scene. The image sensor unit 106 includes a two-dimensional array of individual image sensor elements, such as complementary metal-oxide semiconductor (CMOS) sensor elements, or other sensor elements. The raw frame may be characterized by an array of pixel values produced by the array of image sensor elements.

In an embodiment, the image signal processing unit 108 processes the raw frame received from the image sensor unit 106 and generates a frame which then can be subsequently displayed on the touch screen unit 102. In the embodiment in FIG. 1, the raw frame is first processed by the image signal processing unit 108, then the frame generated by the image signal processing unit 108 is processed by the ROI selecting unit 110 and the fast moving object detecting unit 112. Alternatively, the raw frame may be first processed by the ROI selecting unit 110 and the fast moving object detecting unit 112, and then the raw frame is processed by the image signal processing unit 108. In the embodiment in FIG. 1, the ROI selecting unit 110 may receive a user's selection from the video mode UI unit 104, and the frame from the image signal processing unit 108 and defines an ROI in the frame. The fast moving object detecting unit 112 may, depending on whether the ROI is defined in the frame, perform corresponding fast moving object detection on the frame to determine whether to enter a slow-motion mode and if so, cause the image sensor unit 106 to switch to a new frame rate.

In an embodiment, the preview unit 114 causes a preview of the frame with an indication of being in the slow-motion mode to be displayed. In an embodiment, the data recording unit 116 causes data based on the frame to be written into the data storage unit 118, and therefore a video may be played back later on. In an embodiment, the data storage unit 118 may include any volatile or non-volatile memory or storage device, such as electrically erasable programmable read-only memory (EEPROM), or FLASH memory, or such as a magnetic data storage unit or optical data storage unit.

The units included in the camera system 100 may be realized by any suitable combination of hardware, firmware and/or software. For example, the video mode UI unit 104, the image signal processing unit 108, the ROI selecting unit 110, the fast moving object detecting unit 112, the preview unit 114, and the data recording unit 116 may be software executed by an application processor (AP). For another example, the image signal processing unit 108, the ROI selecting unit 110, and the fast moving object detecting unit 112 may be hardware integrated with the image sensor unit 106, such as hardware implemented on-chip in a stacked sensor. The video mode UI unit 104, the preview unit 114, and the data recording unit 116 may be software executed by the AP.

Figure 2:
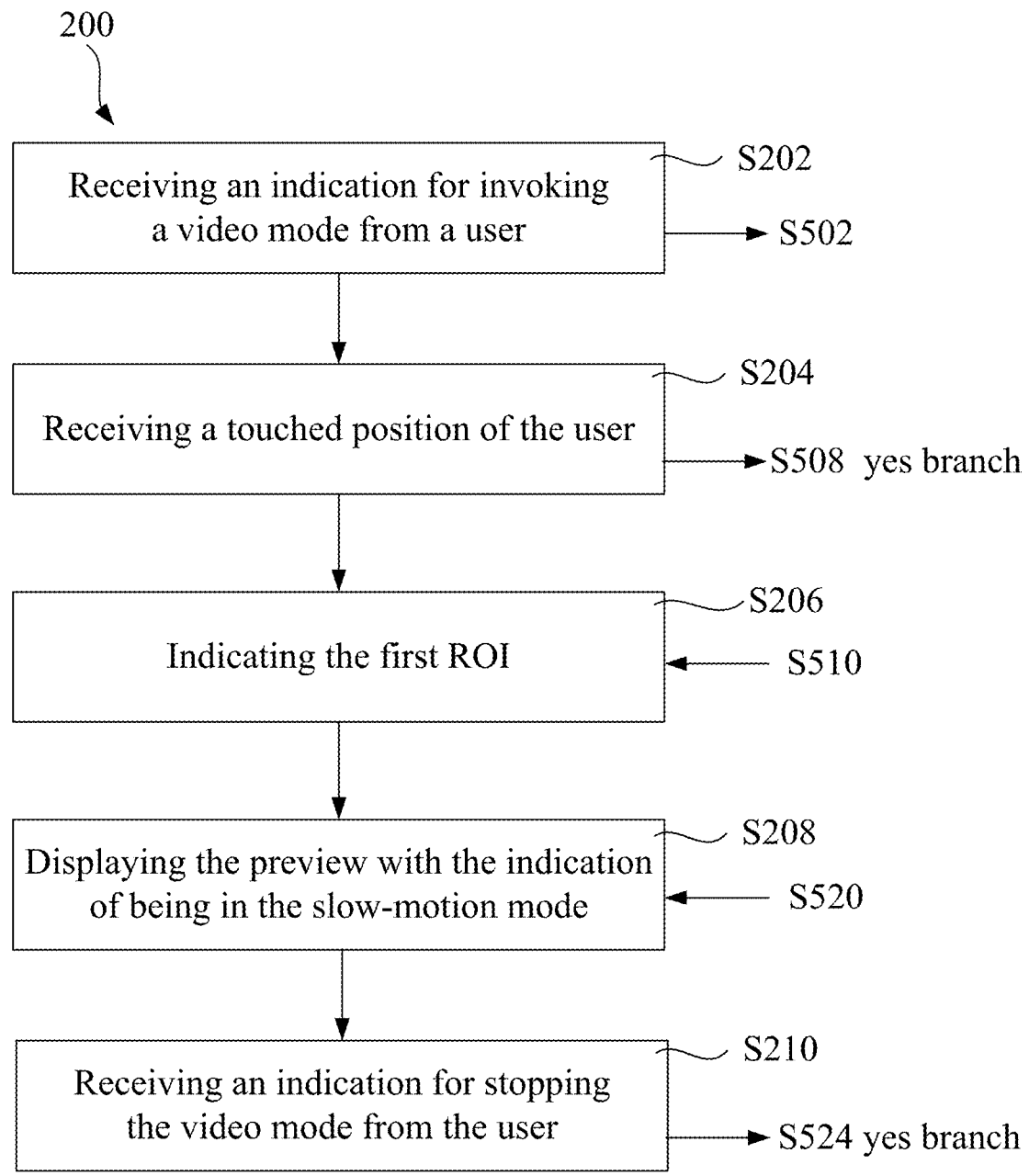
FIG. 2 is a flowchart illustrating operations of a touch screen unit in the camera system according to an embodiment of the present disclosure.
Figure 3:
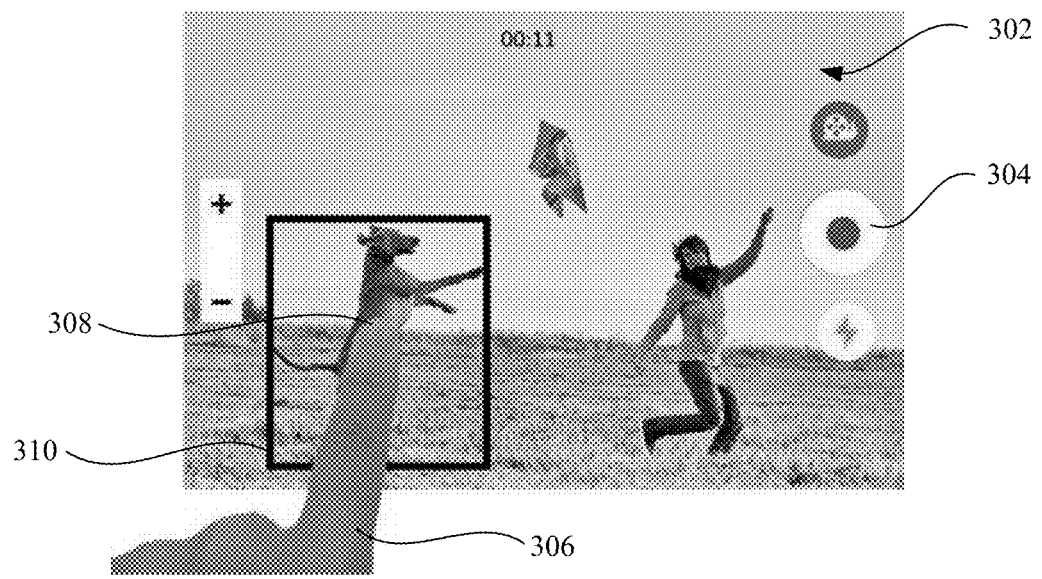
FIG. 3 is a diagram illustrating defining a region of interest (ROI) based on a user's selection on the touch screen unit according to an embodiment of the present disclosure.
Figure 4:
FIG. 4 is a diagram illustrating displaying, on the touch screen unit, a preview with an indication of being in a slow-motion mode according to an embodiment of the present disclosure.
Figure 5:
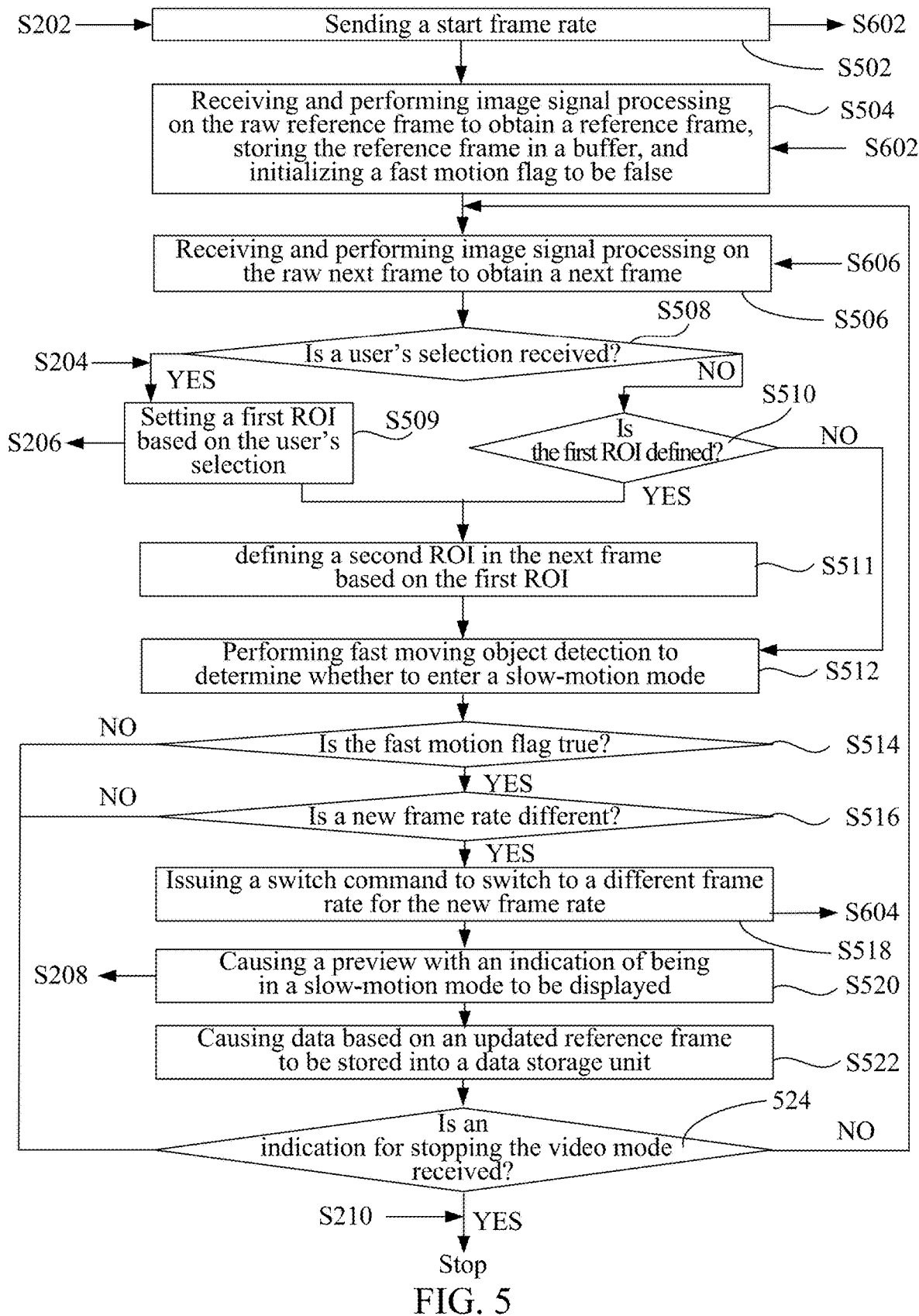
FIG. 5 is a flowchart illustrating operations of a video mode UI unit, an image signal processing unit, an ROI selecting unit, a fast moving object detecting unit, a preview unit, and a data recording unit in the camera system according to an embodiment of the present disclosure.
Figure 6:
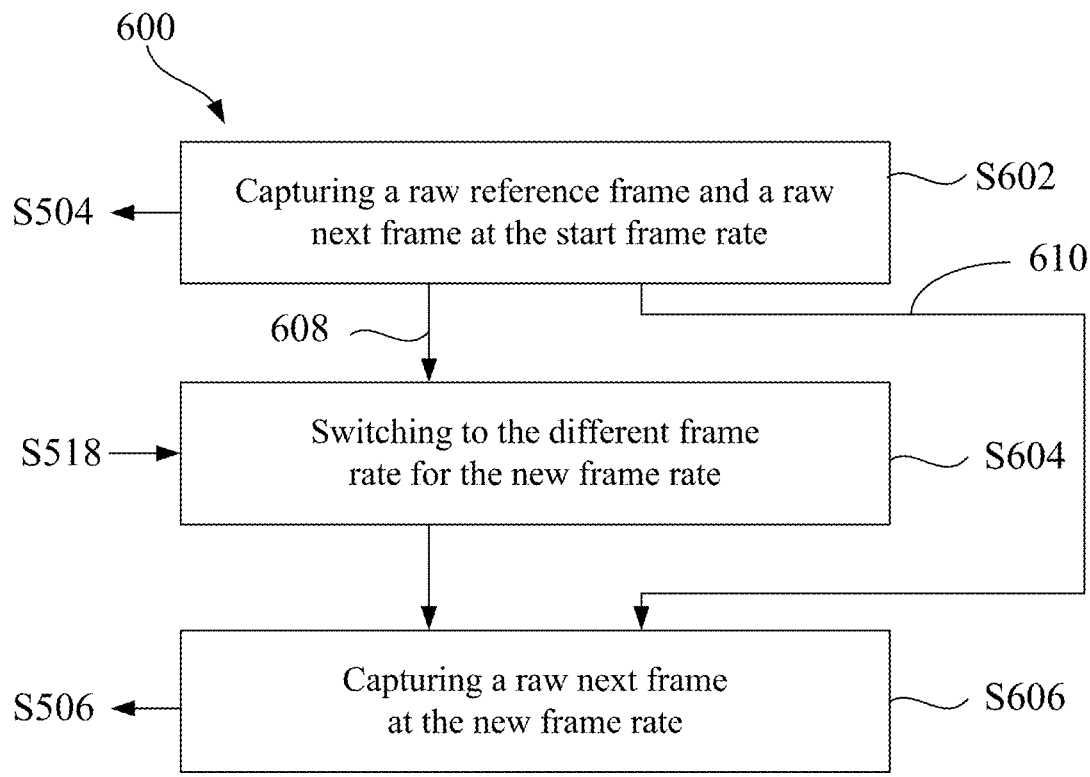
FIG. 6 is a flowchart illustrating operations of an image sensor unit in the camera system according to an embodiment of the present disclosure.

FIG. 2 is a flowchart illustrating operations 200 of the touch screen unit 102 in the camera system 100 according to an embodiment of the present disclosure. FIG. 3 is a diagram illustrating defining an ROI based on a user's selection on the touch screen unit 102 according to an embodiment of the present disclosure. FIG. 4 is a diagram illustrating displaying, on the touch screen unit 102, a preview with an indication of being in a slow-motion mode according to an embodiment of the present disclosure. FIG. 5 is a flowchart illustrating operations 500 of the video mode UI unit 104, the image signal processing unit 108, the ROI selecting unit 110, the fast moving object detecting unit 112, the preview unit 114, and the data recording unit 116 in the camera system 100 according to an embodiment of the present disclosure. FIG. 6 is a flowchart illustrating operations 600 of the image sensor unit 106 in the camera system 100 according to an embodiment of the present disclosure.

Referring to FIG. 1 and FIG. 2, at operation S202, the touch screen unit 102 receives an indication for invoking a video mode from a user. Referring to FIG. 3, in an embodiment, the indication for invoking a video mode is done by pressing a video mode button 304 on a touch screen unit 302. The indication for invoking the video mode causes the camera system 100 to switch to a slow-motion mode automatically as described in the following. Therefore, there is no slow-motion mode button accompanying the video mode button. Operation S202 causes operation S502 in FIG. 5 to be performed. Referring to FIG. 1 and FIG. 5, at operation S502, the video mode UI unit 104 sends a start frame rate to the image sensor unit 106. The start frame rate is a normal frame rate of the video mode. In an embodiment, the normal frame rate may be 30 frames per second (fps) or 60 fps. Operation S502 causes operation S602 in FIG. 6 to be performed. Referring to FIG. 1 and FIG. 6, at operation S602, the image sensor unit 106 captures a raw reference frame and a raw next frame at the start frame rate. In an embodiment, each pixel of the raw reference frame and the raw next frame has a pixel value indicating a raw intensity of one of a red color, a green color and a blue color. Each block of four pixels of the raw reference frame and the raw next frame have corresponding red, green, green and blue colors. Operation S602 causes operation S504 in FIG. 5 to be performed. Referring to FIG. 1 and FIG. 5, at operation S504, the image signal processing unit 108 performs signal processing on the raw reference frame to obtain a reference frame. In an embodiment, the image signal processing unit 108 performs de-mosaicing on the raw reference frame, so that each pixel of a de-mosaiced frame has red, green, and blue pixel values, and then performs color space conversion on the de-mosaiced frame, so that each pixel of a color space converted frame has a luma pixel value and two chroma pixel values. The reference frame obtained is based on the color space converted frame. In addition, at operation S504, the fast moving object detecting unit 112 stores the reference frame in a buffer and initialize a fast motion flag to be false. At operation S506, the image signal processing unit 108 performs signal processing on the raw next frame to obtain a next frame. In an embodiment, similar to operation S504, de-mosaicing and color space conversion are performed to obtain the next frame.

Referring to FIG. 1, FIG. 2, and FIG. 5, at operation S508, the ROI selecting unit 110 determines whether a user's selection is received. When the touch screen unit 102 receives a touched position of the user as the user's selection at operation S204, the ROI selecting unit 110 proceeds along a yes branch to operation S509. When the touch screen unit 102 does not receive the touched position of the user as the user's selection, the ROI selecting unit 110 proceeds along a no branch to operation S510. Referring to FIG. 3, for operation S204, in an embodiment, the touch screen unit 302 receives a touched position 308 of the user 306 as the user's selection for a dog. At operation S509, the ROI selecting unit 110 and the video mode UI unit 104 set a first ROI based on the user's selection. Operation S509 causes operation S206 in FIG. 2 to be performed. At operation S206, the touch screen unit 102 indicates the first ROI. Referring to FIG. 3, in an embodiment, the touch screen unit 302 indicates the first ROI by showing a bounding box 310 around the dog. Alternatively, the indication of the first ROI may be implemented by showing a label of a different shape, such as a circle, an ellipse, a triangle, or a check, and a different size, such as a size bounding around or extending within only a portion of the dog.

Referring to FIG. 1 and FIG. 5, at operation S510, the ROI selecting unit 110 determines whether the first ROI is defined in the reference frame. If the first ROI is defined in the reference frame, operation S511 is performed. If the first ROI is not defined in the reference frame, operation S512 is performed. At operation S511, the ROI selecting unit 110 defines a second ROI in the next frame based on the first ROI. In an embodiment, the second ROI is an enlarged region including a region co-located with the first ROI and a neighborhood of the region. In an embodiment, the enlarged region may be defined similar to a search range for motion estimation.

Referring to FIG. 1 and FIG. 5, at operation S512, the fast moving object detecting unit 112 performs fast moving object detection to determine whether to enter the slow-motion mode. At operation S514, the fast moving object detecting unit 112 determines whether the fast motion flag is true. If the fast motion flag is true, the fast moving object detecting unit 112 proceeds to operation S516, and if the fast motion flag is false, the fast moving object detecting unit 112 proceeds to operation S524. At operation S516, the fast moving object detecting unit 112 determines whether a new frame rate is different. If the new frame rate is different, fast moving object detecting unit 112 proceeds to operation S518, and if the new frame rate is not different, the fast moving object detecting unit 112 proceeds to operation S524. At operation S518, the fast moving object detecting unit 112 issues a switch command to switch to a different frame rate for the new frame rate. Operation S518 causes operation S604 in FIG. 6 to be performed and therefore a branch 608 to be taken. Referring to FIG. 1 and FIG. 6, at operation S604, the image sensor unit 106 switches to the different frame rate for the new frame rate. Referring to FIG. 1, FIG. 5, and FIG. 6, when the new frame rate is determined not different in operation S516 and therefore operation S518 is not performed, a branch 610 is taken.

Referring to FIG. 1 and FIG. 5, at operation S520, based on the fast motion flag to be true, the preview unit 114 causes a preview with an indication of being in the slow-motion mode to be displayed. Operation S520 causes operation S208 in FIG. 2 to be performed. Referring to FIG. 1 and FIG. 2, at operation S208, the touch screen unit 102 displays the preview with the indication of being in the slow-motion mode. Referring to FIG. 4, in an embodiment, a touch screen unit 402 displays a preview which shows what is being captured. The indication of being in the slow-motion mode may be implemented by showing a blinking frame rate 404. The blinking frame rate 404 may have a same number as the new frame rate in operation S518. Referring to FIG. 1 and FIG. 5, at operation S522, the data recording unit 116 causes data based on an updated reference frame to be stored into the data storage unit 118. The updated reference frame is to be described with reference to operation S826 in FIG. 8 below. In an embodiment, the data recording unit 116 causes the updated reference frame in the buffer to be encoded and stored into the data storage unit 118. The updated reference frame may be encoded according to an encoding standard, such as MPEG-2, MPEG-3, MPEG-4, H.263, or H.264.

Referring to FIG. 1 and FIG. 5, at operation S524, the video mode UI unit 104 determines whether an indication for stopping the video mode is received. When the touch screen unit 102 receives an indication for stopping the video mode from the user at operation S210, the video mode UI unit 104 proceeds along a yes branch and stops the video mode. When the touch screen unit 102 does not receive the indication for stopping the video mode, the video mode UI unit 104 proceeds along a no branch, and prepares to loop back to operation S506. Referring to FIG. 1 and FIG. 6, at operation S606, the image sensor unit 106 captures a raw next frame at the new frame rate. Operation S606 causes operation S506 in FIG. 5 to be performed after the video mode UI unit 104 loops back.

In an embodiment, for the reason that only two frames, i.e., a reference frame and a next frame, are processed in every iteration in the operations 500 in FIG. 5, and the determination of whether to enter a slow-motion mode and a corresponding new frame rate is performed in every iteration, the new frame rate may correspond to a speed of movement of, for example, a detected fast moving object. That is, when the fast moving object moves faster, the new frame rate may be determined higher, and when the fast moving object moves slower, the new frame rate may be determined lower.

Figure 7:
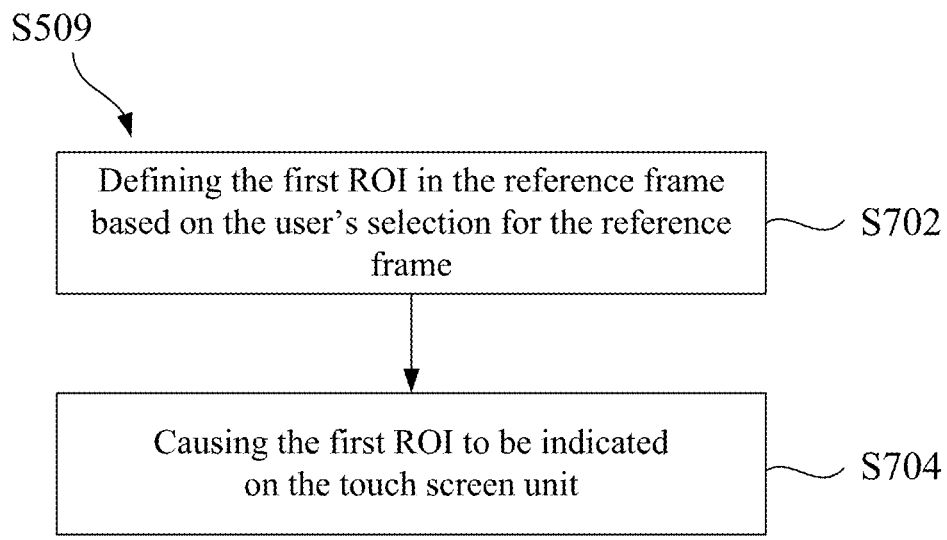
FIG. 7 is a flowchart illustrating ROI selection according to an embodiment of the present disclosure.

FIG. 7 is a flowchart illustrating ROI selection (i.e., operation S509 in FIG. 5) according to an embodiment of the present disclosure. Operation S509 in FIG. 5 includes the following operations. Referring to FIG. 1 and FIG. 7, at operation S702, the ROI selecting unit 110 defines the first ROI in the reference frame based on the user's selection for the reference frame. In an embodiment, the first ROI is a bounding box defined using a region proposal method, such as Selective Search, Edgebox, or Region Proposal Network. In an embodiment, the bounding box may bound only one object selected by the user, such as the dog in FIG. 3. In an embodiment, the bounding box may bound the entire object. In another embodiment, the first ROI is a center position of the object. At operation S704, the video mode UI unit 104 causes the first ROI to be indicated on the touch screen unit 102. As mentioned with respect to operation S510 in FIG. 5, operation S704 causes operation S206 in FIG. 2 to be performed.

Figure 8:
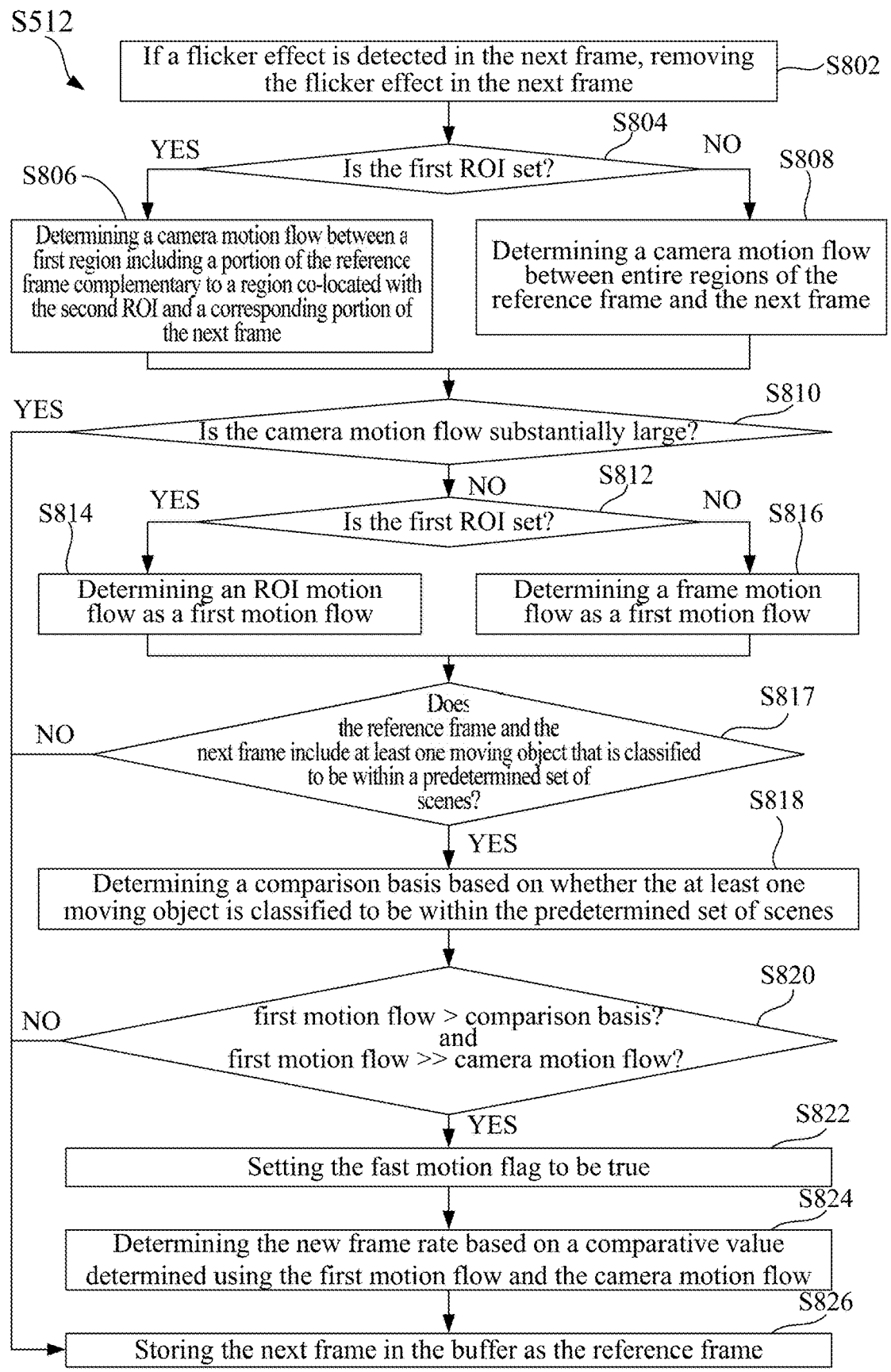
FIG. 8 is a flowchart illustrating fast moving object detection according to an embodiment of the present disclosure.

FIG. 8 is a flowchart illustrating fast moving object detection (i.e., operation S512 in FIG. 5) according to an embodiment of the present disclosure. Operation S512 in FIG. 5 includes the following operations. Referring to FIG. 8, at operation S802, a detection is made whether there is flickering in the next frame, and if so, the flickering is removed in the next frame. The flickering results from non-constant light intensity conditions, such as fluorescent lighting. The flickering may affect a result of motion flow determination and a result of scene recognition, and therefore needs to be removed.

Referring to FIG. 8, at operation S804, a determination is made whether the first ROI is set. If the first ROI is set, operation S806 is performed. If the first ROI is not set, operation S808 is performed. At operation S806, a camera motion flow between a first region including a portion of the reference frame complementary to a region co-located with the second ROI, and a corresponding portion of the next frame is determined. At operation S808, a camera motion flow between entire regions of the reference frame and the next frame is determined. The camera motion flow describes global motion, such as camera left and right panning, up and down tilting, and/or various other effects such as zoom-in and zoom-out.

In an embodiment, the camera motion flow is determined by calculating pixel value differences using a global motion model. For operation S806, parameters of the global motion model are determined using a small portion of the camera motion flow between the first region of the reference frame and the corresponding portion of the next frame. Then, the other portion of the camera motion flow between the first region of the reference frame and the corresponding portion of the next frame are determined using the global motion model. The camera motion flow is a set of pixel value differences, each of which between a pixel in the first region and a co-located pixel in the next frame. In an embodiment, the first region of the reference frame is a portion of the reference frame without a region co-located with the second ROI, and the corresponding portion of the next frame is a portion of the next frame co-located with the first region. Alternatively, the first region of the reference frame is a portion of the reference frame without the first ROI, and the corresponding portion of the next frame is a portion of the next frame co-located with the first region. For operation S808, parameters of the global motion model are determined using a small portion of the camera motion flow between the entire regions of the reference frame and the next frame. Then, the other portion of the camera motion flow between the entire regions of the reference frame and the next frame are determined using the global motion model. The camera motion flow is a set of pixel value differences, each of which between a pixel in the reference frame and a co-located pixel in the next frame. In an embodiment, each pixel value difference is a luma and/or chroma pixel value difference.

In another embodiment, the camera motion flow is determined by calculating motion vectors using a global motion model. For operation S806, parameters of the global motion model are determined using a small portion of the camera motion flow between the first region of the reference frame and the corresponding portion of the next frame. Then, the other portion of the camera motion flow between the first region of the reference frame and the corresponding portion of the next frame are determined using the global motion model. The camera motion flow is a set of motion vectors, each of which indicates motion between a pixel or block in the first region, and a displaced pixel or block in the next frame. In an embodiment, the first region of the reference frame is a portion of the reference frame without a region co-located with the second ROI, and the corresponding portion of the next frame includes displaced pixels or blocks with respect to those in the first region. For operation S808, parameters of the global motion model are determined using a small portion of the camera motion flow between the entire regions of the reference frame and the next frame. Then, the other portion of the camera motion flow between the entire regions of the reference frame and the next frame are determined using the global motion model. The camera motion flow is a set of motion vectors, each of which indicates motion between a pixel or block in the reference frame, and a displaced pixel or block in the next frame.

In another embodiment, the camera motion flow is determined by calculating optical flow vectors using a global motion model. For operation S806, parameters of the global motion model are determined using a small portion of the camera motion flow between the first region of the reference frame and the corresponding portion of the next frame. Then, the other portion of the camera motion flow between the first region of the reference frame and the corresponding portion of the next frame are determined using the global motion model. The camera motion flow is a set of optical flow vectors, each of which indicates motion between a pixel or block in the first region, and a displaced pixel or block in the next frame. In an embodiment, the first region of the reference frame is a portion of the reference frame without a region co-located with the second ROI, and the corresponding portion of the next frame include displaced pixels or blocks with respect to those in the first region. For operation S808, parameters of the global motion model are determined using a small portion of the camera motion flow between the entire regions of the reference frame and the next frame. Then, the other portion of the camera motion flow between the entire regions of the reference frame and the next frame are determined using the global motion model. The camera motion flow is a set of optical flow vectors, each of which indicates motion between a pixel or block in the reference frame, and a displaced pixel or block in the next frame.

Referring to FIG. 8, at operation S810, a determination is made whether the camera motion flow is substantially large. In an embodiment, operation S810 includes determining whether an aggregated camera motion flow exceeds a threshold value. In an embodiment, for the pixel value difference method, the aggregated camera motion flow may be calculated by a variety of difference metrics such as a sum of absolute differences (SAD) for which absolute values of the camera motion flow (i.e., the set of pixel value differences)) are taken and summed, a sum of squared differences (SSD) for which squared values the camera motion flow are taken and summed, a mean of absolute difference (MAD) for which absolute values of the camera motion flow are taken and averaged, and a mean of squared difference (MSD) for which squared values of the camera motion flow are taken and averaged. In another embodiment, for the motion vector method, the aggregated camera motion flow may be a motion vector strength for which L2 norm of the camera motion flow (i.e., the set of motion vectors) is taken and averaged. In another embodiment, for the optical flow method, the aggregated camera motion flow may be an optical flow vector strength for which L2 norm of the camera motion flow (i.e., the set of optical flow vectors) is taken and averaged. In an embodiment, the threshold value is determined based on a resolution of the image sensor unit 106. In an embodiment, for the motion vector method or the optical flow method, the threshold value is determined or further determined based on a block size used for generating the set of motion vectors or the set of optical flow vectors. In an embodiment, the threshold value is determined or further determined based on completeness of used pixel values of each pixel involved in camera motion flow determination. For example, complete luma pixel value, and two chroma pixel values may be used. Alternatively, less complete pixel values, such as only the luma pixel value may be used.

Referring to FIG. 8, if the camera motion flow is substantially large, operation S826 is performed, and if the camera motion flow is not substantially large, operation S812 is performed. At operation S812, a determination is made whether the first ROI is set. If the first ROI is set, operation S814 is performed. If the first ROI is not set, operation S816 is performed. At operation S814, an ROI motion flow is determined as a first motion flow. At operation S816, a frame motion flow is determined as a first motion flow. Operation S814 will be further described with reference to FIG. 9 below.

Frame motion describes local motion such as movements of all objects in a field of view of the image sensor unit 106 in FIG. 1. For operation S816, in an embodiment, the frame motion flow is determined by calculating pixel value differences using a local motion model. Parameters of the local motion model are determined using a small portion of the frame motion flow between the entire regions of the reference frame and the next frame. Then, the other portion of the frame motion flow between the entire regions of the reference frame and the next frame are determined using the local motion model. The frame motion flow is a set of pixel value differences, each of which between a pixel in the reference frame and a co-located pixel in the next frame. In an embodiment, each pixel value difference is a luma and/or chroma pixel value difference. In another embodiment, the frame motion flow is determined by calculating motion vectors using a local motion model. Parameters of the local motion model are determined using a small portion of the frame motion flow between the entire regions of the reference frame and the next frame. Then, the other portion of the frame motion flow between the entire regions of the reference frame and the next frame are determined using the local motion model. The frame motion flow is a set of motion vectors, each of which indicates motion between a pixel or block in the reference frame, and a displaced pixel or block in the next frame. In another embodiment, the frame motion flow is determined by calculating optical flow vectors using a local motion model. Parameters of the local motion model are determined using a small portion of the frame motion flow between the entire regions of the reference frame and the next frame. Then, the other portion of the frame motion flow between the entire regions of the reference frame and the next frame are determined using the local motion model. The frame motion flow is a set of optical flow vectors, each of which indicates motion between a pixel or block in the reference frame, and a displaced pixel or block in the next frame.

Referring to FIG. 8, at operation S817, a determination is made whether the reference frame and the next frame include at least one moving object that is classified to be within a predetermined set of scenes. If the at least one moving object is classified to be within the predetermined set of scenes, operation S818 is performed. If the at least one moving object is not classified to be within the predetermined set of scenes, operation S826 is performed. Operation S817 will be further described with reference to FIG. 10 below. At operation S818, a comparison basis is determined based on whether the at least one moving object is classified to be within the predetermined set of scenes. Operation S818 will be further described with reference to FIG. 10 below.

At operation S820, a first comparison result of the first motion flow with the comparison basis is generated. In an embodiment, the first comparison result is generated by comparing an aggregated motion flow with the comparison basis, wherein the comparison basis is a threshold value. In an embodiment, the aggregated motion flow may be calculated similarly as the aggregated camera motion flow mentioned with respect to operation S810. In addition, at operation S820, a second comparison result of the first motion flow with the camera motion flow is further generated. In an embodiment, the second comparison result is generated by comparing an averaged motion flow with an averaged camera motion flow. The averaged motion flow may be the same as or different from the aggregated motion flow. The averaged camera motion flow may be the same as or different from the aggregated camera motion flow mentioned with respect to operation S810. In an embodiment, the averaged motion flow and the averaged camera motion flow may be calculated using the averaged difference metrics, the motion vector strength method or the optical flow strength method mentioned with respect to operation S810. If the first comparison result is positive (e.g. the aggregated motion flow is larger than the comparison basis), and the second comparison result is positive (e.g. the averaged motion flow is much larger than the averaged camera motion flow, such as 2 times or 3 times the averaged camera motion flow), operation S822 is performed. If either or both the first comparison result and the second comparison result are negative (e.g. either or both the aggregated motion flow is smaller than the comparison basis and the averaged motion flow is much smaller than the averaged camera motion flow, such as one half or one third the averaged camera motion flow), operation S826 is performed.

Referring to FIG. 8, at operation S822, the fast motion flag is set to be true. At operation S824, the new frame rate is determined based on a comparative value determined using the first motion flow and the camera motion flow. In an embodiment, the comparative value is a ratio of the averaged motion flow and the averaged camera motion flow. The averaged motion flow and the average camera motion flow have been described with reference to operation S820. In an embodiment, a relationship between new frame rates and comparative values is defined by a lookup table. For example, a ratio of 1:1 is mapped to 60 fps, and a ratio of 2:1 is mapped to 120 fps, etc. In another embodiment, the new frame rate is further determined based on a depth of the at least one moving object. For different depths, corresponding relationships between new frame rates and comparative values are defined by different lookup tables. At operation S826, the next frame is stored in the buffer as the reference frame. Therefore, the refined second ROI in the next frame before operation S826 becomes the first ROI in the reference frame after operation S826.

Figure 9:
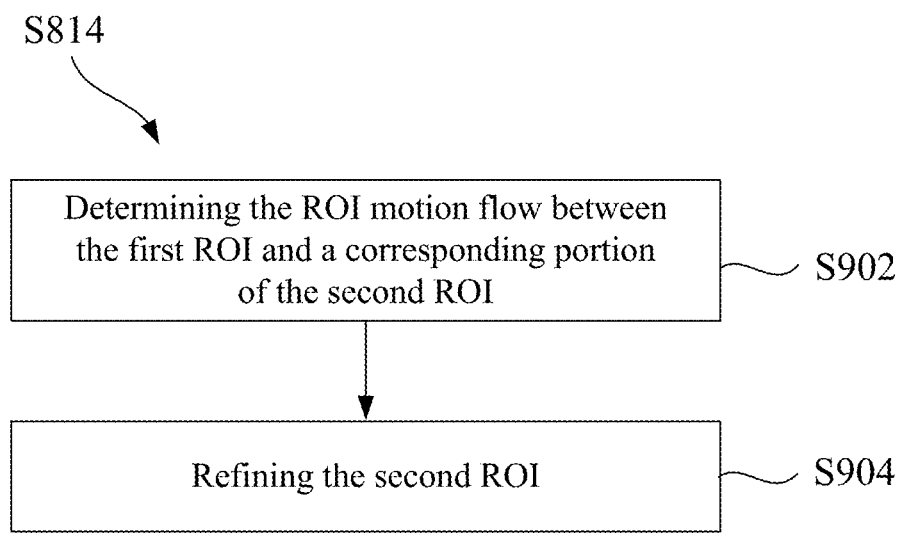
FIG. 9 is a flowchart illustrating ROI motion flow determination for the fast moving object detection according to an embodiment of the present disclosure.

FIG. 9 is a flowchart illustrating ROI motion flow determination (i.e., operation S814) for the fast moving object detection according to an embodiment of the present disclosure. Operation S814 in FIG. 8 includes the following operations. Referring to FIG. 9, at operation S902, the ROI motion flow between the first ROI and a corresponding portion of the second ROI are determined. The ROI motion flow describes local motion such as movements of the selected object. In an embodiment, the ROI motion flow is determined by calculating pixel value differences using a local motion model. Parameters of the local motion model are determined using a small portion of the ROI motion flow between the first ROI of the reference frame and the corresponding portion of the second ROI of the next frame. Then, the other portion of the ROI motion flow between the first ROI and the corresponding portion of second ROI are determined using the local motion model. The ROI motion flow is a set of pixel value differences, each of which between a pixel in the first ROI and a co-located pixel in the second ROI. The corresponding portion of the second ROI is a portion of the second ROI co-located with the first ROI. In another embodiment, the ROI motion flow is determined by calculating motion vectors using a local motion model. Parameters of the local motion model are determined using a small portion of the ROI motion flow between the first ROI of the reference frame and the corresponding portion of the second ROI of the next frame. Then, the other portion of the ROI motion flow between the first ROI and the corresponding portion of the second ROI are determined using the local motion model. The ROI motion flow is a set of motion vectors, each of which indicates motion between a pixel or block in the first ROI, and a displaced pixel or block in the second ROI. The corresponding portion of the second ROI includes displaced pixels or blocks with respect to those in the first ROI. In another embodiment, the ROI motion flow is determined by calculating optical flow vectors using a local motion model. Parameters of the local motion model are determined using a small portion of the ROI motion flow between the first ROI of the reference frame and the corresponding portion of the second ROI of the next frame. Then, the other portion of the ROI motion flow between the first ROI and the corresponding portion of the second ROI are determined using the local motion model. The ROI motion flow is a set of optical flow vectors, each of which indicates motion between a pixel or block in the first ROI, and a displaced pixel or block in the second ROI. The corresponding portion of the second ROI includes displaced pixels or blocks with respect to those in the first ROI.

Referring to FIG. 9, at operation S904, the second ROI is refined. In an embodiment, the enlarged region in operation S511 is refined into a region bounding the portion of the second ROI corresponding to the first ROI using the ROI motion flow in operation S902. In another embodiment, the enlarged region in operation S511 is refined into a region corresponding to the first ROI, wherein the first ROI is treated as a unit in calculating, for example, a motion vector that displaces the region with respect to the first ROI.

Figure 10:
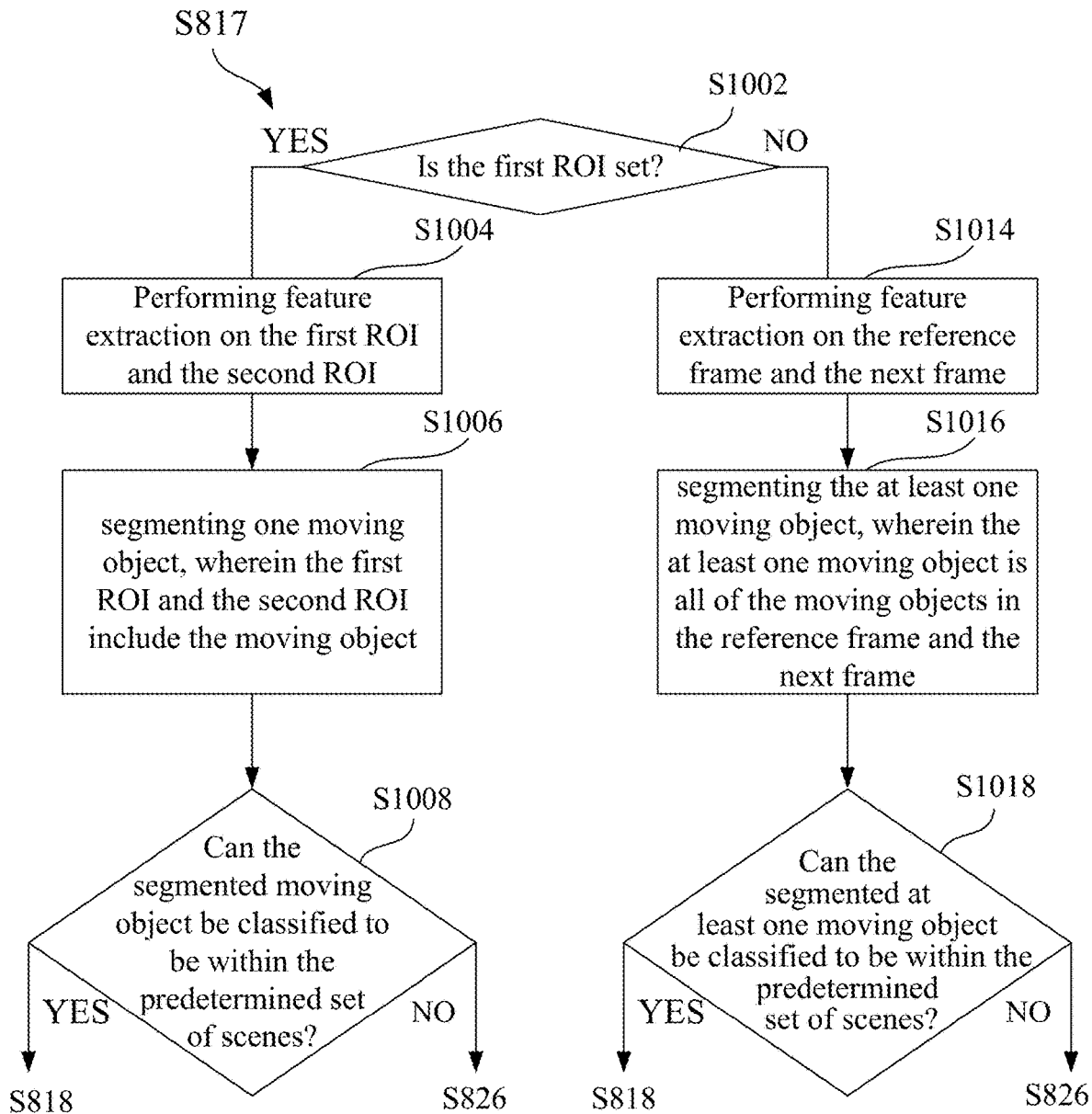
FIG. 10 is a flowchart illustrating scene recognition for the fast moving object detection according to an embodiment of the present disclosure.

FIG. 10 is a flowchart illustrating scene recognition (i.e., operation S817) for the fast moving object detection according to an embodiment of the present disclosure. Referring to FIG. 10, at operation S1002, a determination is made whether the first ROI is set. If the first ROI is set, operation S1004 is performed. If the first ROI is not set, operation S1014 is performed. At operation S1004, feature extraction is performed on the first ROI and the refined second ROI. In an embodiment, spatio-temporal features are extracted. The spatio-temporal features may be determined based on the ROI motion flow. In an embodiment, the spatio-temporal features may be shallow features based on shape and motion. In another embodiment, the spatio-temporal features may be deep features determined by at least one 2D convolutional neural network (CNN) that takes features based on the ROI motion flow as an input. In another embodiment, the spatio-temporal features may be deep features determined by at least one 3D CNN.

Referring to FIG. 10, at operation S1006, one moving object is segmented, wherein the first ROI and the second ROI include the moving object. In an embodiment, the spatio-temporal features are first used to generate a result of foreground background segmentation, and then a background model is used to refine the result of foreground background segmentation. Then, the refined result of foreground background segmentation is used to refine the ROI motion flow. In the result of foreground background segmentation and the refined result of foreground background segmentation, each pixel or block in the reference frame and the next frame is classified as a foreground pixel or block, or a background pixel or block. The foreground pixels in the refined result of foreground background segmentation form the segmented moving object. In an embodiment, the background model includes changing background that is not of interest for frame rate determination, such as waving trees. In an embodiment, for shallow features, clustering may be used to generate the result of foreground background segmentation and the refined result of foreground background segmentation. In an embodiment, for deep features determined by the at least one 2D CNN, the at least one 2D CNN may be used to generate the result of foreground background segmentation and the refined result of foreground background segmentation. In an embodiment, for deep features determined by the at least one 3D CNN, the at least one 3D CNN may be used to generate the result of foreground background segmentation and the refined result of foreground background segmentation.

Referring to FIG. 10, at operation S1008, a determination is made whether the segmented moving object can be classified to be within the predetermined set of scenes. If the segmented moving object can be classified to be within the predetermined set of scenes, operation S818 is performed. If the segmented moving object cannot be classified to be within the predetermined set of scenes, operation S826 is performed. In an embodiment, the predetermined set of scenes may be at least one model trained for recognizing an object and at least one action performed by the object, wherein the object and the at least one action are typically encountered by users of the camera system 100 described with reference to FIG. 1. For example, when the camera system 100 is a mobile phone, the object and the at least one action performed by the object may be a pet running or swimming, a baby walking, a child running, jumping or dancing, and a ball flying. In an embodiment, operation S1008 includes determining a probability of whether the segmented moving object is within the predetermined set of scenes. If the probability exceeds a threshold value, operation S818 is performed. If the probability does not exceed the threshold value, operation S826 is performed. In an embodiment, the probability is determined by classifying the segmented moving object, and if the segmented object can be recognized, classifying the refined ROI motion flow to determine whether the refined ROI motion flow correspond to one of a few action options associated with the recognized object. Depending on a precision of the at least one model, actions may be more precisely differentiated to generate more action options or less precisely differentiated to generate fewer action options. For example, when the at least one model is more precise, such as that divides a human body into more parts, a child jumping may be differentiated from a child dancing. Therefore, when the segmented moving object is classified to be a child, the action options are running, jumping and dancing. When the at least one model is less precise, such as that divides a human body into fewer parts, a child jumping may not be differentiated from a child dancing. Therefore, when the segmented moving object is classified to be a child, the action options are running, and jumping or dancing. In an embodiment, for shallow features, the probability may be determined by a linear classifier. In another embodiment, for deep features determined by the at least one 2D CNN, the at least one 2D CNN may be used to determine the probability. In another embodiment, for deep features determined by the at least one 3D CNN, the at least one 3D CNN may be used to determine the probability.

Referring to FIG. 10, at operation S1014, feature extraction is performed on the reference frame and the next frame. Operation S1014 is similar to operation S1004 except feature extraction is performed for the entire reference frame and the entire next frame. At operation S1016, at least one moving object is segmented, wherein the at least one moving object is all of the moving objects in the reference frame and the next frame. Operation S1016 is similar to operation S1006 except segmentation is performed for the entire reference frame and next frame. At operation S1018, a determination is made whether the segmented at least one moving object can be classified to be within the predetermined set of scenes. Operation S1018 is similar to operation S1008 except classification is performed for the entire reference frame and the next frame.

Referring to FIG. 10, in an embodiment, operation S818 includes setting the comparison basis on the probability, wherein the probability may be the probability determined in operation S1008 or the probability determined in operation S1018. In another embodiment, operation S817 in FIG. 8 is not performed, and operation S818 includes operations similar to operations S1002, S1004, S1006, S1008, S1014, S1016, and S1018 except for each of operations S1008 and S1018, the corresponding probability is not used to form a corresponding condition and is directly used to set the corresponding comparison basis.

Figure 11:
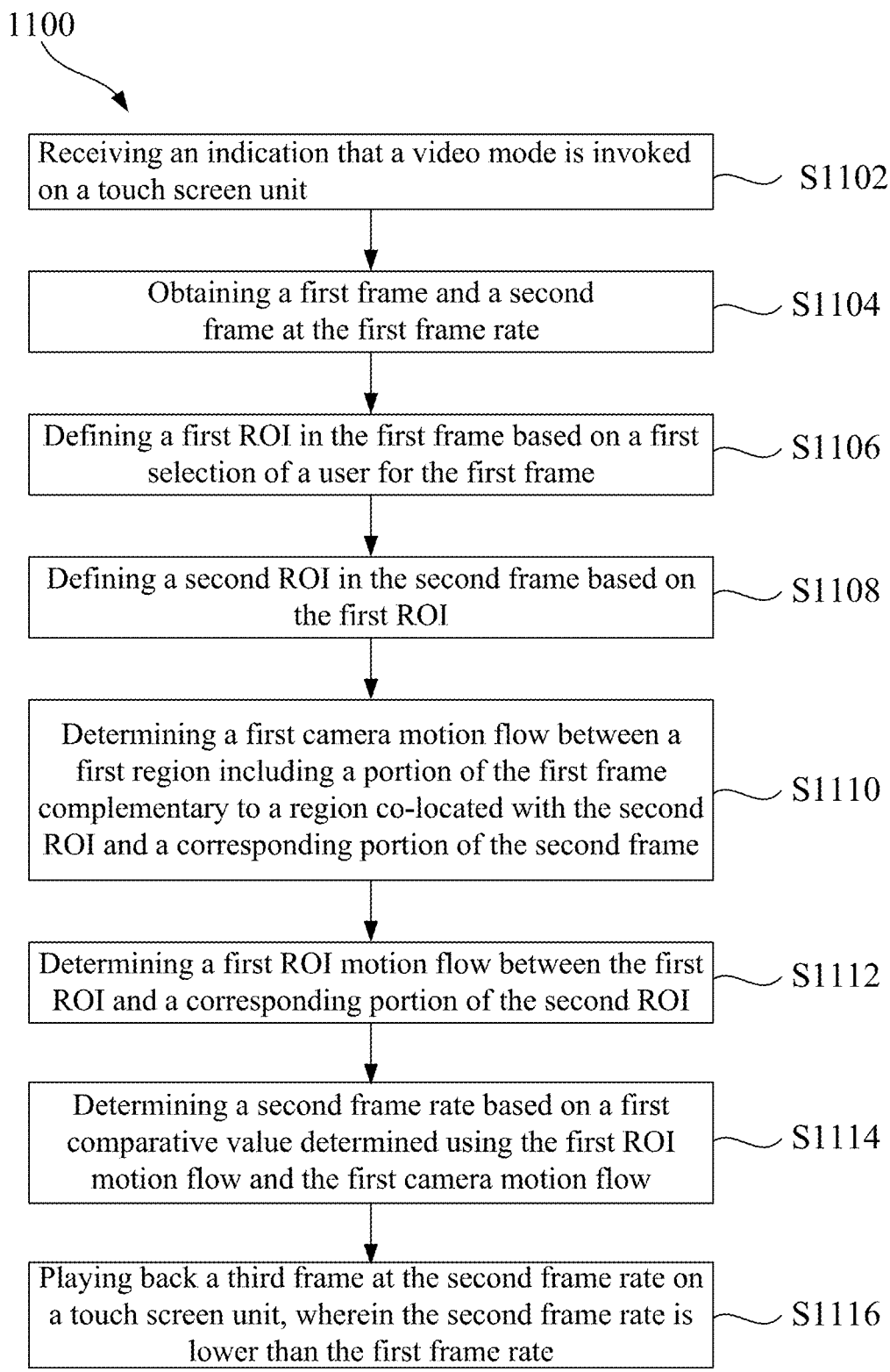
FIG. 11 is a flowchart illustrating a method for switching a video playing back frame rate according to an embodiment of the present disclosure.

FIG. 11 is a flowchart illustrating a method for switching a video playing back frame rate according to an embodiment of the present disclosure. Referring to FIG. 11, at operation S1102, an indication that a video mode is invoked is received on a touch screen unit. At operation S1104, a first frame and a second frame are obtained at the first frame rate. At operation S1106, a first ROI is defined in the first frame based on a first selection of a user for the first frame. At operation S1108, a second ROI in the second frame is defined based on the first ROI. At operation S1110, a first camera motion flow between a first region including a portion of the first frame complementary to a region co-located with the second ROI and a corresponding portion of the second frame is determined. At operation S1112, a first ROI motion flow between the first ROI and a corresponding portion of the second ROI is determined. At operation S1114, a second frame rate is determined based on a first comparative value determined using the first ROI motion flow and the first camera motion flow. At operation S1116, a third frame is played back at the second frame rate on a touch screen unit, wherein the second frame rate is slower than the first frame rate. The camera system and the method for switching the video capturing frame rate described with reference to FIGS. 1 to 10 may be adapted to implement the method for switching the video playing back frame rate in the present embodiment.

Figure 12:
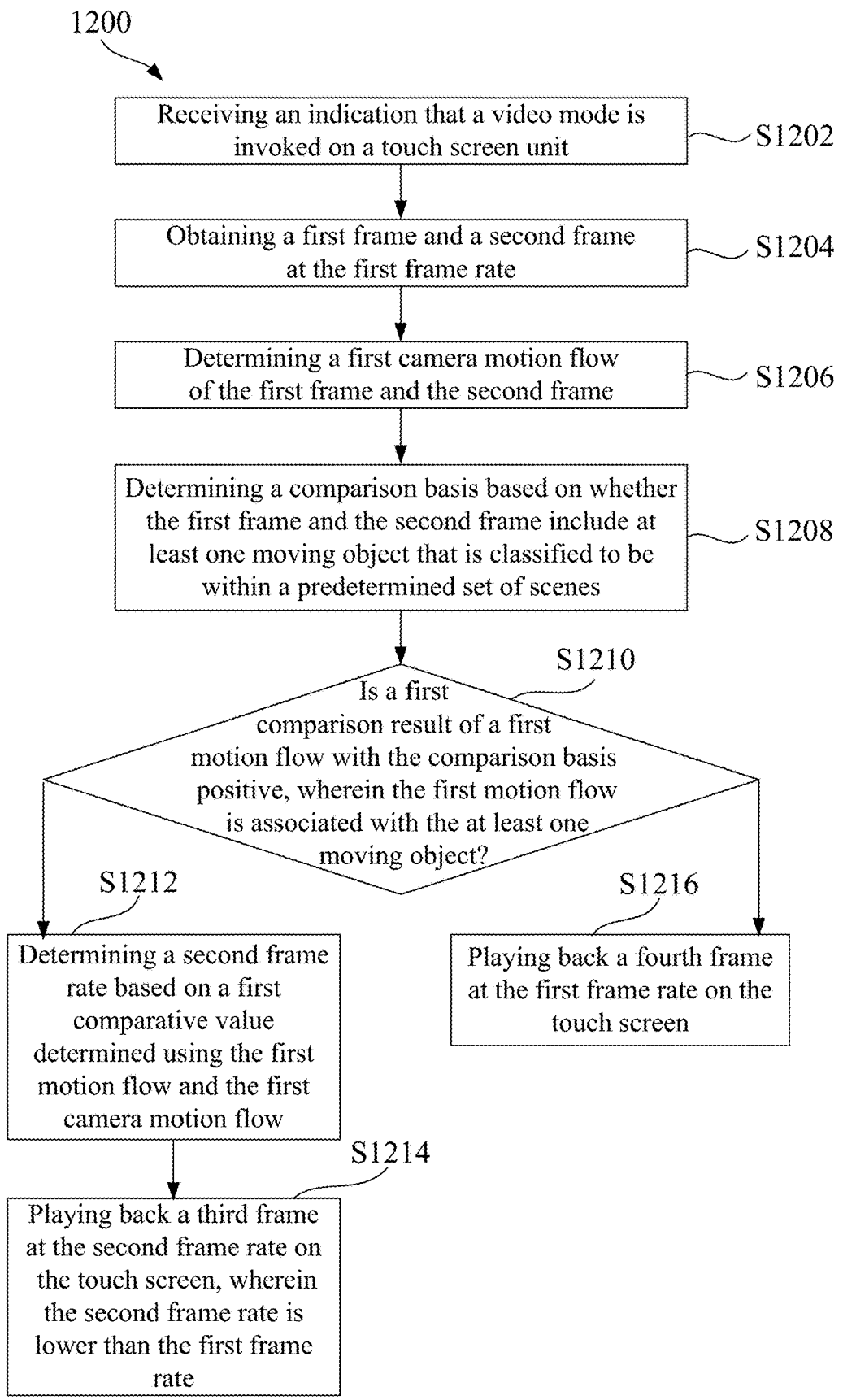
FIG. 12 is a flowchart illustrating a method for switching a video playing back frame rate according to another embodiment of the present disclosure.

FIG. 12 is a flowchart illustrating a method for switching a video playing back frame rate according to another embodiment of the present disclosure. Referring to FIG. 12, at operation S1202, an indication that a video mode is invoked is received on a touch screen. At operation S1204, a first frame and a second frame are obtained at the first frame rate. At operation S1206, a first camera motion flow of the first frame and the second frame is determined. At operation S1208, a comparison basis is determined based on whether the first frame and the second frame include at least one moving object that is classified to be within a predetermined set of scenes. At operation S1210, a determination is made whether a first comparison result of a first motion flow with the comparison is positive. The first motion flow is associated with the at least one moving object. If the first comparison result is positive, operation S1212 is performed. If the first comparison result is negative, operation S1216 is performed. At operation S1212, a second frame rate is determined based on a first comparative value determined using the first motion flow and the first camera motion flow. At operation S1214, a third frame is played back at the second frame rate on the touch screen, wherein the second frame rate is lower than the first frame rate. At operation S1216, a fourth frame is played back at the first frame rate on the touch screen. The camera system and the method for switching the video capturing frame rate described with reference to FIGS. 1 to 10 may be adapted to implement the method for switching the video playing back frame rate in the present embodiment.

Figure 13:
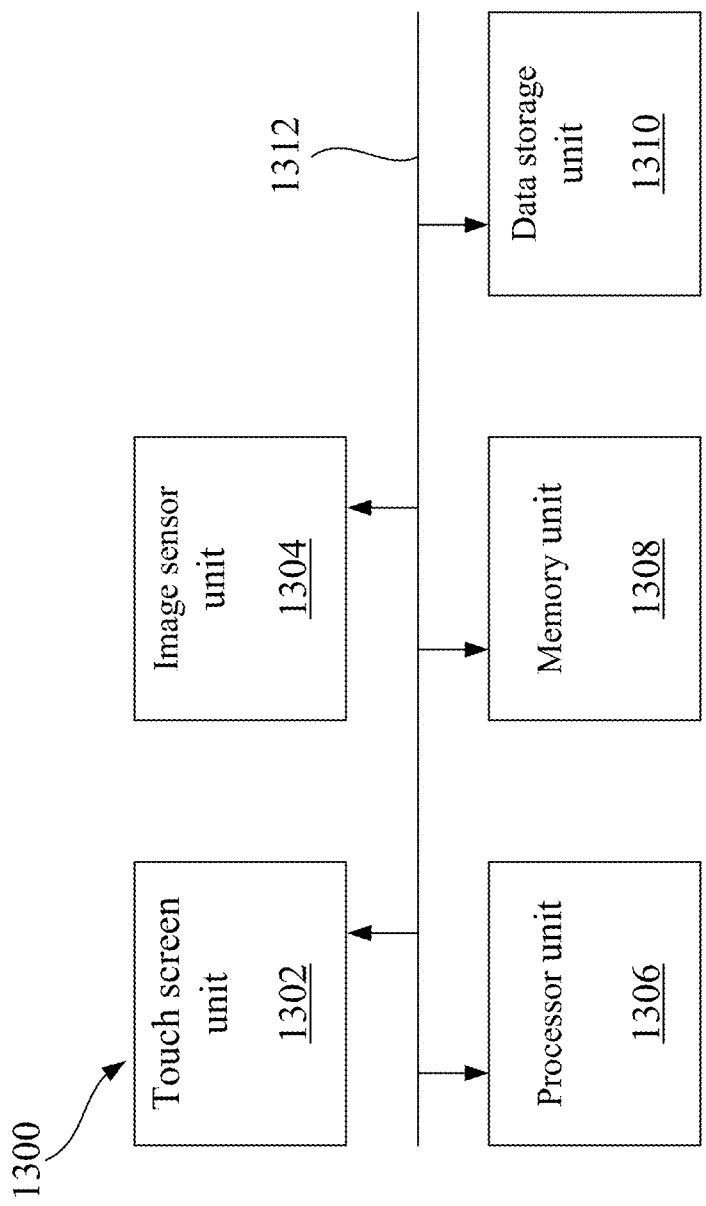
FIG. 13 is a camera system automatically switching a video capturing frame rate or video playing back frame rate according to another embodiment of the present disclosure.

FIG. 13 is a camera system 1300 automatically switching a video capturing frame rate or video playing back frame rate according to an embodiment of the present disclosure. Referring to FIG. 13, the camera system 1300 includes a touch screen unit 1302, an image sensor unit 1304, a processor unit 1306, a memory unit 1308, and a data storage unit 1310. Referring to FIG. 1 and FIG. 13, in an embodiment, the camera system 1300 may be any of the camera system 100 that implements the video mode UI unit 104, the image signal processing unit 108, the ROI selecting unit 110, the fast moving object detecting unit 112, the preview unit 114, and the data recording unit 116 by software. The touch screen unit 1302 may be similar to the touch screen unit 102 described with reference to FIG. 1. The image sensor unit 1304 may be similar to the image sensor unit 106 described with reference to FIG. 1. The data storage unit 1310 may be similar to the data storage unit 118 described with reference to FIG. 1. The memory unit 1308 may be a non-transitory computer-readable medium that stores instructions executable by the processor unit 1306. In an embodiment, when the processor unit 1306 executes the instructions, the processor unit 1306 performs operations described with reference to FIGS. 5, 7, 8, 9, and 10, operations described with reference to FIG. 11, or operations described with reference to FIG. 12. The processor unit 1306 may send signals to and/or receive signals from the touch screen unit 1302, the image sensor unit 1304, and the data storage unit 1310 via bus 1312.

Some embodiments have one or a combination of the following features and/or advantages. In an embodiment, once an indication that a video mode is invoked on a touch screen is received, the operations for automatically switching the video capturing frame rate or the video playing back frame rate are performed. In this way, a slow-motion mode is integrated with the video mode, and manual switch from the video mode to the slow-motion mode, which may result in missing timing for desired capturing, may be prevented. In an embodiment, an ROI is defined based on a user's selection, and the determination of the video capturing frame rate or the video playing back frame rate is based on motion associated with the ROI. In this way, motion associated with the ROI that the user is more interested in may be captured in slow-motion or played back in slow-motion. In an embodiment, the video capturing frame rate or the video played back frame rate is determined based on whether at least one moving object in ROIs of frames or entire regions of the frames is classified to be within a predetermined set of scenes. In this way, determining a scene that the user is experiencing is within a predetermined set of scenes may assist in switching the video capturing frame rate or the video playing back frame rate earlier than switching the video capturing frame rate or the video playing back frame rate based on the user's judgement. In an embodiment, only two frames are processed in every iteration for determining the video capturing frame rate or the video playing back frame rate. In this way, the video capturing frame rate or the video playing back frame rate may correspond to a speed of movement of the at least one moving object. Therefore, power usage of a camera system may be optimized.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure.

It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:
1. A method, comprising:
receiving an indication that a video mode is invoked on a touch screen unit, wherein the receiving the indication causes the following operations to be automatically performed:
obtaining a first frame and a second frame at a first frame rate;

defining a first region of interest (ROI) in the first frame based on a first selection of a user for the first frame;
defining a second ROI in the second frame based on the first ROI;
determining a first camera motion flow between a first region comprising a portion of the first frame complementary to a region co-located with the second ROI and a corresponding portion of the second frame;
determining a first ROI motion flow between the first ROI and a corresponding portion of the second ROI;
determining a second frame rate based on a first comparative value determined using the first ROI motion flow and the first camera motion flow; and
capturing a third frame at the second frame rate by an image sensor unit, wherein the second frame rate is higher than the first frame rate, or playing back a fourth frame at the second frame rate on the touch screen unit, wherein the second frame rate is lower than the first frame rate.

2. The method of claim 1, further comprising:
receiving a touched position of the user on a touch screen unit, wherein the touched position is the first selection of the user for the first frame.

3. The method of claim 1, further comprising:
indicating the first ROI on the touch screen unit, wherein the first ROI bounds only one object in the first frame;
wherein for the capturing the third frame at the second frame rate, the method further comprises:
indicating the capturing the third frame at the second frame rate on the touch screen unit.

4. The method of claim 1, further comprising:
determining a comparison basis based on whether the first ROI and the second ROI comprise a moving object that is classified to be within a predetermined set of scenes; and
if a first comparison result of the first ROI motion flow with the comparison basis is positive, the determining the second frame rate, and the capturing the third frame at the second frame rate or the playing back the fourth frame at the second frame rate are performed;
if the first comparison result of the first ROI motion flow with the comparison basis is negative, capturing a fifth frame at the first frame rate by the image sensor unit or playing back a sixth frame at the first frame rate on the touch screen unit.

5. The method of claim 4, wherein the determining the comparison basis comprises:
segmenting the moving object;
determining a probability that the segmented moving object is within the predetermined set of scenes; and
setting the comparison basis based on the probability.

6. The method of claim 4, wherein the first comparison result of the first ROI motion flow with the comparison basis is generated by:
comparing an aggregated ROI motion flow with the comparison basis, wherein the aggregated ROI motion flow is determined using the ROI motion flow, and the comparison basis is a first threshold value.

7. The method of claim 4, wherein:
if the first comparison result of the first ROI motion flow with the comparison basis and a second comparison result of the first ROI motion flow with the first camera motion flow are positive, the determining the second frame rate, and the capturing the third frame at the second frame rate or the playing back the fourth frame at the second frame rate are performed; and if either or both the first comparison result of the first ROI motion flow with the comparison basis and the second comparison result of the first ROI motion flow with the first camera motion flow are negative, the capturing the fifth frame at the first frame rate or the playing back the sixth frame at the first frame rate is performed.

8. The method of claim 4, further comprising:
determining whether the moving object is classified to be within the predetermined set of scenes; and
if the moving object is classified to be within the predetermined set of scenes, the determining the comparison basis is performed;
if the moving object is not classified to be within the predetermined set of scenes, the determining the comparison basis is not performed, and the capturing the fifth frame at the first frame rate by the image sensor unit or the playing back the sixth frame at the first frame rate on the touch screen unit is performed.

9. The method of claim 8, wherein the determining whether the moving object is classified to be within a predetermined set of scenes comprises:
segmenting the moving object;
determining a probability that the segmented moving object is within the predetermined set of scenes;
wherein if the probability exceeds a second threshold value, the determining the comparison basis is performed; if the probability does not exceed the second threshold value, the determining the comparison basis is not performed, and the capturing the fifth frame at the first frame rate by the image sensor unit or the playing back the sixth frame at the first frame rate on the touch screen unit is performed; and
wherein the determining the comparison basis comprises:
setting the comparison basis based on the probability.

10. The method of claim 1, wherein the first comparative value is determined by:
obtaining a ratio of an averaged ROI motion flow and an averaged camera motion flow, wherein the first comparative value is the ratio, the averaged ROI motion flow is determined using the first ROI motion flow, and the averaged camera motion flow is determined using the first camera motion flow.

11. The method of claim 1, wherein the determining the second frame rate is further based on a depth of the first ROI.

12. The method of claim 1, further comprising:
obtaining a plurality of frames at the second frame rate;
defining a plurality of ROIs correspondingly in the plurality of frames based on a second selection of the user for one frame of the plurality of frames and/or the second ROI in the second frame, wherein a seventh frame is the second to the last frame in the plurality of frames, a third ROI is the second to the last ROI in the plurality of ROIs, an eighth frame is the last frame in the plurality of frames, and a fourth ROI is the last ROI in the plurality of ROIs;
determining a second camera motion flow between a third region comprising a portion of the seventh frame complementary to a region co-located with the fourth ROI and a corresponding portion of the eighth frame;
determining a second ROI motion flow between the third ROI and a corresponding portion of the fourth ROI;
determining a third frame rate based on a second comparative value determined using the second ROI motion flow and the second camera motion flow;
capturing a ninth frame at the third frame rate by the image sensor unit, wherein the third frame rate is lower than the second frame rate, or playing back a tenth frame at the third frame rate on the touch screen unit, wherein the third frame rate is higher than the second frame rate.

13. The method of claim 1, further comprising:
if an aggregated camera motion flow exceeds a third threshold value, the determining the first ROI motion flow, the determining second frame rate, and the capturing the third frame at the second frame rate or the playing back the fourth frame at the second frame rate are not performed, and capturing an eleventh frame at the first frame rate by the image sensor unit, or playing back a twelfth frame at the first frame rate by the touch screen unit is performed, wherein the aggregated camera motion flow is determined using the first camera motion flow.

14. A method, comprising:
receiving an indication that a video mode is invoked on a touch screen unit, wherein the receiving the indication causes the following operations to be automatically performed:
  obtaining a first frame and a second frame at a first frame rate;
  determining a first camera motion flow of the first frame and the second frame;
  determining a comparison basis based on whether the first frame and the second frame comprise at least one moving object that is classified to be within a predetermined set of scenes; and
  if a first comparison result of a first motion flow with the comparison basis is positive, determining a second frame rate based on a first comparative value determined using the first motion flow and the first camera motion flow, wherein the first motion flow is associated with the at least one moving object; and capturing a third frame at the second frame rate by an image sensor unit, wherein the second frame rate is higher than the first frame rate, or playing back a fourth frame at the second frame rate on the touch screen unit, wherein the second frame rate is lower than the first frame rate;
  if the first comparison result of the first motion flow with the comparison basis is negative, capturing a fifth frame at the first frame rate by the image sensor unit or playing back a sixth frame at the first frame rate on the touch screen unit.

15. The method of claim 14, wherein the determining the comparison basis comprises:
  segmenting the at least one moving object;
  determining a probability that the at least one segmented moving object is within the predetermined set of scenes; and
  setting the comparison basis based on the probability.

16. The method of claim 14, wherein the first comparison result of the first motion flow with the comparison basis is generated by:
  comparing an aggregated motion flow with the comparison basis, wherein the aggregated motion flow is determined using the first motion flow, and the comparison basis is a first threshold value.

17. The method of claim 14, wherein:
if the first comparison result of the first motion flow with the comparison basis and a second comparison result of the first motion flow with the first camera motion flow are positive, the determining the second frame rate, and the capturing the third frame at the second frame rate or the playing back the fourth frame at the second frame rate are performed; and
if either or both the first comparison result of the first motion flow with the comparison basis and the second comparison result of the first motion flow with the first camera motion flow are negative, the capturing the fifth frame at the first frame rate or the playing back the sixth frame at the first frame rate is performed.

18. The method of claim 14, further comprising:
determining whether the at least one moving object is classified to be within a predetermined set of scenes; and
if the at least one moving object is classified to be within the predetermined set of scenes, the determining the comparison basis is performed;
if the at least one moving object is not classified to be within the predetermined set of scenes, the determining the comparison basis is not performed, and the capturing the fifth frame at the first frame rate by the image sensor unit or the playing back the sixth frame at the first frame rate on the touch screen unit is performed.

19. The method of claim 18, wherein the determining whether the at least one moving object is classified to be within a predetermined set of scenes comprises:
  segmenting the at least one moving object;
  determining a probability that the at least one segmented moving object is within the predetermined set of scenes;
wherein if the probability exceeds a second threshold value, the determining the comparison basis is performed; if the probability does not exceed the second threshold value, the determining the comparison basis is not performed, and the capturing the fifth frame at the first frame rate by the image sensor unit or the playing back the sixth frame at the first frame rate on the touch screen unit is performed; and
wherein the determining the comparison basis comprises:
  setting the comparison basis based on the probability.

20. The method of claim 14, wherein the first comparative value is determined by:
  obtaining a ratio of an averaged motion flow and an averaged camera motion flow, wherein the first comparative value is the ratio, the averaged motion flow is determined using the first motion flow, and the averaged camera motion flow is determined using the first camera motion flow.

* * * * *